Dec. 4, 1956     A. S. FULTON ET AL     2,773,185

LOW FREQUENCY RANDOM-NOISE GENERATOR

Filed Jan. 5, 1952

INVENTORS,
ROBERT R. BENNETT,
ALBERT S. FULTON,
BY Seymour M. Rosenberg
ATTORNEY.

United States Patent Office 2,773,185
Patented Dec. 4, 1956

2,773,185

LOW FREQUENCY RANDOM-NOISE GENERATOR

Albert S. Fulton and Robert R. Bennett, Los Angeles, Calif., assignors, by mesne assignments, to Hughes Aircraft Company, a corporation of Delaware Application January 5, 1952, Serial No. 265,176

6 Claims. (Cl. 250—36)

This invention relates to a low frequency random-noise generator, and more particularly to an electronic generator which generates electrical random noise signals below the audible frequency spectrum by heterodyning random noise of a selected bandwidth with a signal having a frequency equal to the center frequency of the selected bandwidth.

Evaluation of the performance of automatic control systems often involves a consideration of the behaviour of such systems in the presence of low frequency random noise. The noise many be of an undesirable nature, such as receiver noise, or it may represent a plurality of statistical inputs which the system is to follow. Although analytical techniques are available for determining the response of linear systems to noise inputs, no general technique is available for analyzing the noise response of nonlinear systems subject to noise inputs.

It has been proposed that noise response characteristics of nonlinear systems may be ascertained by representing the systems as electrical analog computers or simulators to which is applied a low frequency random-noise signal. An immediate consequence of such a proposal, however, is that the random-noise signal applied should have certain characteristics, namely, a specified spectral density over the noise bandwidth, a predetermined amplitude distribution, a mean value which is controllable, substantially no periodicity over the noise bandwidth, and a frequency spectrum extending from substantially zero cycles per second to some predetermined frequency approaching the audible frequency spectrum. The noise generators of the prior art, as pointed out below, generate noise which does not conform to these characteristics, and have, therefore, been found inadequate for low frequency noise analysis.

A substantial number of the prior art noise generators are utilized as sources of noise signals for "jamming" radio receivers and other radio frequency apparatus. Two prime considerations in the design of such noise generators are that the noise spectrum fall within the audible frequency spectrum, and that the noise power generated be as high as possible. In order to obtain large noise power outputs, it is common practice to key the noise source with a periodic voltage and to use the resultant ionic current output as the generated noise. Obviously, therefore, the specific design requirements of such a noise generator invalidate the use of the generator in low frequency noise response measurements because the frequency range is too high, and periodic keying of the noise source generates periodic frequency components. Furthermore, it may be shown that the spectral density of noise generated over a relatively large frequency spectrum is nonuniform, thereby rendering this type of noise generator completely unsuitable for low frequency noise analysis.

Still other noise generators of the prior art are used for simulating atmospheric static noise and for simulating the noise heard in operating aircraft. Again, the very same restrictions apply to the use of these noise generators in low frequency noise response measurements. The fundamental problem encountered in the design of this type of noise generator is the production of audible noise through the medium of a loud speaker, and no consideration is given to low frequency amplitude distribution, spectral density, or the mean or direct current voltage level of the generated noise. It is evident, therefore, that noise generators of this nature cannot be applied to the problem of low frequency noise analysis.

The present invention provides a low frequency random-noise generator which functions to heterodyne random noise of a selected frequency bandwidth with a signal having a frequency equal to the center frequency of the selected bandwidth to produce low frequency random noise suitable for application in the analysis of the noise response of nonlinear systems. By properly selecting the noise bandwidth applied to the heterodyner, and by selectively filtering the output of the heterodyner, one may produce row frequency random noise having uniform spectral density and a known amplitude distribution over a frequency spectrum extending from zero cycles per second to a predetermined value of frequency. In addition, by using a heterodyner comprising a balanced demodulator or mixer, one may obtain a mean noise level in the random noise output which is substantially equal to zero. Furthermore, it may be shown by mathematical analysis that the resultant low frequency noise is substantially free of any periodic components.

It is, therefore, an object of this invention to provide an electronic generator for generating low frequency random noise.

Another object of this invention is to provide an electronic generator for generating low frequency random noise over a frequency bandwidth extending from zero cycles per second to a frequency value below the audible frequency spectrum.

It is a further object of this invention to provide a low frequency random-noise generator for generating noise below the audible frequency spectrum.

An additional object of this invention is to provide a low frequency random-noise generator for generating noise having a substantially uniform power spectrum over the noise bandwidth.

It is still another object of this invention to provide a low frequency noise generator for generating noise having substantially zero mean value.

It is still further an object of this invention to provide a low frequency noise generator for generating noise having substantially no periodicity over the noise bandwidth.

It is still an additional object of this invention to provide a noise generator which generates random noise over a selected bandwidth, and heterodynes and filters said noise to obtain low frequency random noise.

It is also an object of this invention to provide the novel features which are believed to be characteristic of the invention as set forth in the appended claims. The invention itself, however, both as to its organization and method of operation, together with further objects and advantages thereof, may be best understood by reference to the following description taken in connection with the accompanying drawings. It is to be expressly understood, however, that the drawings are for the purpose of illustration and description only, and are not intended as a definition of the limits of the invention.

Figure 1:
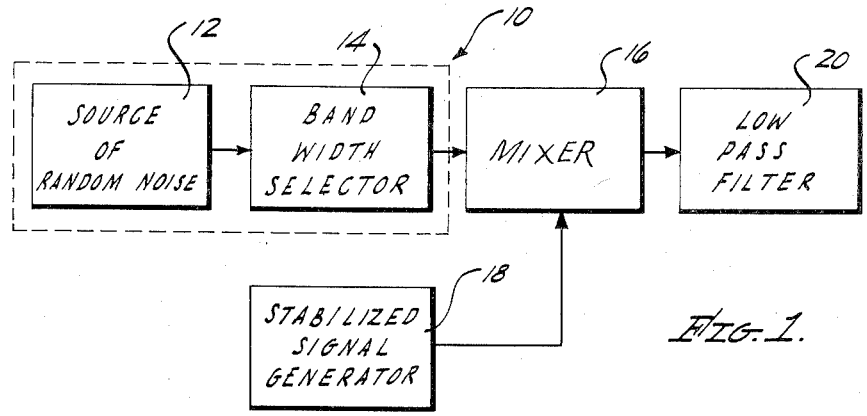
Fig. 1 is a block diagram of a low frequency random-noise generator according to this invention.

Referring now to the drawings, there is shown in Fig. 1 a block diagram of a low frequency random-noise generator comprising a selective random-noise generator, generally designated 10, which includes a source 12 of random noise and a bandwidth selector 14, the input terminals of selector 14 being connected to the output terminals of noise source 12.

Noise source 12 may include any of several suitable random noise sources, such as, for example, a gas discharge tube, a Geiger counter, a photoconductive unit, or the like. A circuit including a type 2D21 gas thyratron, operated as a gaseous diode by interconnecting the grids and cathode, has been utilized satisfactorily in noise source 12 for generating noise over a relatively large frequency spectrum.

Bandwidth selector 14, which may be any conventional bandpass device, such as, for example, a bandpass amplifier or a bandpass filter, is tuned to a predetermined frequency in the noise spectrum generated by noise source 12, and has a pass band of predetermined bandwidth centered about the predetermined tuned frequency. Although numerous bandpass devices may be utilized, a bandpass amplifier has been found preferable when a high amplitude random-noise output signal is desired.

The output terminals of bandwidth selector 14 are coupled to a first input circuit of a mixer or heterodyner 16, a second input circuit of mixer 16 being coupled to the output terminals of a stabilized signal generator 18. Signal generator 18 may be any of several conventional stabilized signal generators, such as a square-wave generator including an electronic oscillator stabilized or controlled by a tuning fork. The signal generated by signal generator 18 has a predetermined frequency equal to the predetermined tuned frequency of bandwidth selector 14.

Mixer 16 is provided for mixing or heterodyning the respective outputs of bandwidth selector 14 and signal generator 18 to produce an output signal including a low frequency random-noise component. A low-pass filter 20 is connected to the output circuit of modulator 16 and is responsive to the output signal thereof for passing certain desired frequency components and for attenuating or rejecting certain undesired frequency components. Filter 20 may be any of numerous conventional low-pass filters such as, for example, an M or K derived filter section, a crystal filter, or a high frequency bypass capacitor.

In describing the operation of the low frequency random-noise generator herein disclosed, it will be assumed, for purposes of illustration, that a random-noise signal is desired which has a frequency spectrum extending from zero cycles per second to twenty-five cycles per second, and a spectral density which is essentially uniform over the frequency spectrum specified.

In operation, noise source 12 functions to produce a random noise over a relatively large frequency spectrum including the audible frequency range. It is known that the random noise generated by such a noise source does not have uniform spectral density over the entire noise spectrum generated or a statistically normal or gaussian amplitude distribution. However, there are certain regions of the generated noise spectrum which do have uniform spectral density and a substantially normal amplitude distribution. Therefore, by tuning bandwidth selector 14 to a predetermined center frequency $f_0$ within one of these regions of the noise spectrum, one may obtain random noise having the desired noise characteristics over a selected bandwidth.

The bandwidth or pass band characteristics of bandwidth selector 14 are predetermined by the frequency spectrum of the low-frequency noise to be generated, the bandwidth between half power points being preferably twice the low frequency noise bandwidth or spectrum desired. Thus, if it is desired to generate random noise over a frequency spectrum extending from zero to twenty-five cycles per second, bandwidth selector 14 is adjusted to pass a bandwidth of 50 cycles per second.

For purposes of illustration, it will be further assumed that the predetermined frequency $f_0$ to which bandwidth selector 14 is tuned is 4000 cycles per second. Obviously then, the pass band region between half power points will extend from 3975 cycles per second to 4025 cycles per second.

Similarly, stabilized signal generator 18 is also tuned to 4000 cycles per second, since it may be recalled that the predetermined tuning frequency of signal generator 18 is equal to the center or tuned frequency $f_0$ of bandwidth selector 14. The selectively passed random-noise output of bandwidth selector 14 and the stabilized electrical output signal from signal generator 18 are applied to mixer 16.

Mixer 16 functions to heterodyne or mix the selectively-passed random noise with the stabilized electrical signal to produce an output signal including a low frequency random-noise component which in this instance has a frequency spectrum extending from zero to twenty-five cycles per second. Stated differently, the heterodyning action of mixer 16 produces an output signal of sum and difference frequency components, together with components centered at 4000 cycles per second and harmonics thereof. By applying conventional terminology, the difference frequency component may, therefore, be considered a lower sideband component of the output signal. Still another way of considering the output signal from mixer 16 is that a low frequency noise-modulated signal is produced.

The output signal from mixer 16 is applied to low-pass filter 20, which functions to pass only the low frequency random-noise component of the output signal, and attenuates or rejects the relatively high-frequency components. The random-noise generator herein disclosed thereby provides a random-noise output of low frequency noise over a frequency spectrum extending from zero to twenty-five cycles per second.

The low frequency noise generated, therefore, extends over the desired bandwidth and has substantially uniform spectral density throughout the bandwidth. It is to be understood, of course, that the spectral density of the random noise generated may be varied to conform to any specified power spectrum by using conventional selective filtering techniques. The bandwith of the low frequency noise may be extended by increasing the pass band of bandwidth selector 14, at the expense of a correspondingly lower power density at the low frequencies. The low frequency random noise generated is also substantially free of periodic frequency components. Strictly speaking, one can determine only that periodic components, if present, are "unlikely," in a statistical sense, to be greater than an arbitrarily small amount. In order to maintain uniform spectral density in the random-noise output signal, the signal frequency of generator 18 should be maintained equal to the predetermined center frequency of bandwidth selector 14. It may be recalled that signal generator 18 is stabilized in some manner such as by a driven tuning fork. To maintain the tuning of bandwidth selector 14 at a predetermined frequency, a stabilized core inductor, and low or negative temperature coefficient capacitors may be used in the tuning circuit of bandwidth selector 14.

In many applications of the low frequency random-noise generator herein disclosed, it may be desirable to produce random noise having a low mean or direct-current voltage level relative to the root mean square value of the noise produced. Should this be the case, mixer 16 may comprise a balanced demodulator, such as, for example, the ring demodulator illustrated in Fig. 2.

Figure 2:
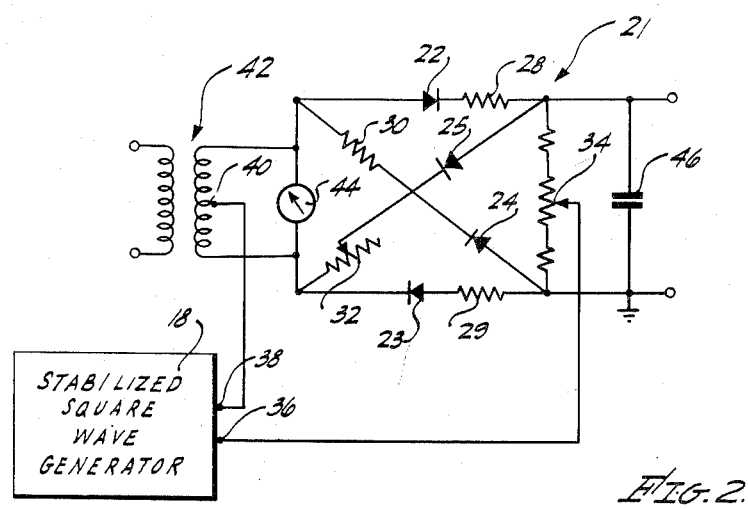
Fig. 2 is a schematic circuit diagram of a mixer and low pass filter which may be used in the noise generator of Fig. 1.

Referring now to Fig. 2, there is shown a conventional ring demodulator generally designated 21 which includes four matched crystal diodes 22 through 25, respectively. The diodes may be a type 1N42 crystal diode wherein four matched diodes are contained within one envelope. Diodes 22 through 24 are connected in series with resistors 28 through 30, respectively, whereas diode 25 is connected in series with a rheostat 32 which is provided for balancing demodulator 21. A second demodulator balance is provided by a potentiometer 34, one terminal of which is connected to an output terminal 36 of square-wave signal generator 18. A second output terminal 38 of square-wave signal generator 18 is connected to a center tap 40 in the secondary winding of a transformer 42, which is utilized for coupling bandwidth selector 14 to demodulator 21. A meter 44 is connected across the secondary of transformer 42 to indicate the noise generator output by measuring the output of bandwidth selector 14. Meter 44 is an averaging type meter having a time constant of several seconds, thereby preventing undesirable fluctuation in noise level indications which might otherwise be caused by individual noise components of relatively high or low amplitude. The circuit of Fig. 2 also includes a low-pass filter, such as capacitor 46, which is connected across the output of demodulator 21 for selectively passing the low frequency random-noise component in the output signal from demodulator 21.

In operation, random noise of a selected bandwidth at the output of bandwidth selector 14 is impressed on demodulator 21 through the coupling action of transformer 42, while the stabilized square-wave signal from signal generator 18 is applied across demodulator 21 between center tap 40 and potentiometer 34. In a balanced demodulator of this type, diodes 22 through 25 act as a high frequency double pole-double throw switch. Therefore, the amplitude of the square-wave signal applied by signal generator 18 should be sufficiently large relative to the amplitude of the selectively passed random-noise signal so that the stabilized square-wave signal may effectively control the switching action of demodulator 21. Furthermore, inasmuch as diodes 22 through 25 are nonlinear devices, i. e., have nonlinear response characteristics, it is desirable to apply a square-wave switching signal in order to eliminate distortion in the output signal which might result if a stabilized sinusoidal signal were applied to demodulator 21.

The output signal produced by heterodyner or demodulator 21 includes a low frequency random noise component which is passed by capacitor 46, whereas the relatively high frequency components present in the output signal from demodulator 21 are substantially attenuated by capacitor 46. By properly adjusting rheostat 32 and potentiometer 34, a balanced modulation output signal may be produced which has a relatively low mean value. For example, if the root-mean-square value of the low frequency random-noise output signal is five volts, demodulator 21 will maintain a balance over extended periods of time and over normal variations in room temperature such that the mean value of the low frequency random-noise output remains less than five one hundredths of a volt. Additionally, it may be shown by mathematic analysis that the low frequency random-noise output from this invention has a statistically normal, or gaussian, amplitude distribution, as desired.

It is sometimes desirable to produce low frequency random noise which has essentially zero mean value. The mean value of the output signal produced by the noise generator herein disclosed, while sufficiently low for most simulator purposes, may be made negligibly small by connecting the output of the generator to a conventional electronic analog amplifier filter, such as the filter illustrated in Fig. 3.

Figure 3:
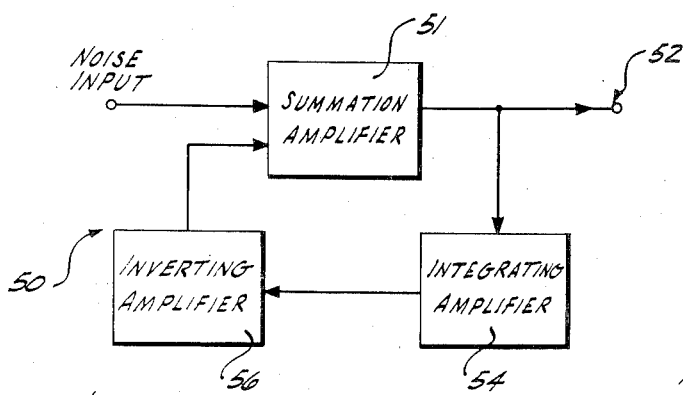
Fig. 3 is a block diagram of an electric analog filter which may be connected to the noise generator of Fig. 1 for substantially eliminating any direct-current voltage component present in the low frequency random noise produced.

Referring now to Fig. 3, there is shown an electronic analog amplifier filter, generally designated 50, which includes a conventional analog summation amplifier 51 for electronically adding first and second input signals which are impressed on amplifier 51 through first and second input circuits, respectively. The first input circuit of amplifier 51 is connected to the output terminals of the low frequency random-noise generator herein disclosed, the output circuit of amplifier 51 being connected to a noise output terminal 52, and to the input circuit of an analog integrating amplifier 54. Amplifier 54 is connected in series with a signal inverting amplifier 56 to form a feedback loop, the output of which is applied to the second input circuit of amplifier 51. Analog filter 50, therefore, constitutes a null seeking device which continually functions to remove any direct-current voltage component present in the output signal of the low frequency random-noise generator.

When analog filter 50 is utilized in combination with the present invention, the low frequency random-noise output signal is applied to summation amplifier 51, which functions to add the low frequency random-noise signal with the output signal from inverting amplifier 56, the function of which is described below. The output of summation amplifier 51 is then impressed on integrating amplifier 54 which functions to continuously integrate the low frequency random-noise output signal from amplifier 51.

Obviously, if the output signal applied to integrating amplifier 54 has a zero mean value, integration of the signal over a predetermined length of time results in no output signal from amplifier 54. Conversely, if the random-noise output signal from amplifier 51 does have a mean value, or stated differently, a direct-current voltage component, the integration process results in a direct-current voltage output signal from amplifier 54 having a magnitude and polarity proportional to the mean value present in the output signal from amplifier 51. The output signal from amplifier 54 is impressed on inverting amplifier 56, which inverts and amplifies the integrated signal to produce an output signal equal in magnitude to the mean level of the random-noise signal applied to amplifier 51, but having opposite polarity. The output signal from inverting amplifier 56 is, in turn, applied to the second input circuit of amplifier 51 which functions to add the inverted integrated signal to the low frequency random-noise signal applied from the low frequency random-noise generator, thereby producing an output signal at output terminal 52 which is substantially free of any direct-current voltage component.

Since the feedback function of analog filter 50 is continuous and may be adjusted to a high degree of precision, the mean value of the low frequency random-noise output of analog filter 50 is substantially equal to the equivalent drift voltage at the input of integrating amplifier 54, and may be made less than ten microvolts. When utilizing an analog filter of this type, the gain of amplifiers 54 and 56 should be maintained within predetermined limits in order to properly remove any direct-current voltage component present in the random noise output without unduly attenuating those low frequency random-noise components which have a frequency approaching zero cycles per second.

According to the foregoing description of the invention, it may be seen that the random-noise generator herein disclosed may be utilized for generating low frequency noise which has uniform spectral density, a normal amplitude distribution and a controllable mean value over a band width extending from substantially zero cycles per second to some predetermined value of frequency.

Obviously, many modifications and variations of the present invention may be made therein without departing from the spirit and scope of the invention as set forth in the appended claims.

What is claimed as new is:

1. A very low frequency random noise generator for generating a selected narrow band of low frequencies including zero comprising: generating means for generating electrical random noise over a selected frequency spectrum extending well up in the audio region; a tunable bandpass filter having a passband of approximately twice the width of said selected narrow band of low frequencies centered about a selected relatively high audio frequency in said frequency spectrum, said filter being electrically connected to said generator means; a square wave generator for generating a square wave signal having a frequency equal to said selected relatively high audio frequency; and a balanced ring demodulator electrically coupled to said bandpass filter and to said square wave generator, said demodulator heterodyning said selected high audio band of frequencies with said square wave signal thereby producing said low frequency random noise over said narrow band of frequencies including zero.

2. The device of claim 1 including a low-pass filter connected to the output of said ring demodulator whereby frequencies other than those in the selected narrow band of frequencies including zero are attenuated and substantially eliminated from the output of said generator.

3. A very low frequency random noise generator for generating a narrow band of low frequencies including zero comprising: generating means for generating electrical random noise over a frequency spectrum extending at least well up in the audio region; tunable bandpass means tuned to a selected frequency well up in said audio frequency region and having a passband approximately twice the width of said narrow band of low frequencies including zero, said bandpass means being electrically connected to said generating means; a signal generator for generating electrical wave energy having a frequency equal to the mid-frequency of said bandpass means; and a balanced mixer electrically coupled to said bandpass means and to said signal generator, said mixer heterodyning the selectively passed random noise with said electrical wave energy to produce electrical noise energy over a band of low frequencies including zero.

4. The device of claim 3 including a low-pass filter connected to the output of said mixer for attenuating any frequencies other than said very low frequencies whereby only said narrow band of very low frequencies including zero is produced in the output of said low frequency random noise generator.

5. A very low frequency random noise generator for generating a narrow band of very low frequencies including zero comprising: an electronic circuit including a gaseous discharge device for generating random noise over a frequency spectrum extending well up into the audio region; a tunable bandpass amplifier tuned to a selected frequency well up in the audio region in said frequency spectrum and having a passband approximately equal to twice the width of said narrow band of very low frequencies including zero, said amplifier being electrically connected to said electronic circuit for selectively amplifying and selectively passing a band of noise signals; a square wave generator for generating a square wave signal having a frequency equal to the selected frequency of said bandpass amplifier; a balanced ring demodulator electrically coupled to said bandpass amplifier and to said square wave generator, said demodulator adapted to heterodyne the selectively amplified random noise with said square wave signal for producing said narrow band of very low frequencies including zero.

6. The device of claim 5 including low frequency pass means connected to the output of said ring demodulator for eliminating from the output of said very low frequency random noise generator any signals other than said selected band of very low frequencies including zero.

References Cited in the file of this patent

UNITED STATES PATENTS

| | | |
|---|---|---|
| 2,324,797 | Norton | July 20, 1943 |
| 2,416,307 | Grieg | Feb. 25, 1947 |
| 2,462,093 | Grimes | Feb. 22, 1949 |
| 2,483,226 | Newman | Sept. 27, 1949 |
| 2,490,487 | Stevens | Dec. 6, 1949 |
| 2,496,723 | Hipple | Feb. 7, 1950 |
| 2,545,250 | Appert | Mar. 13, 1951 |
| 2,562,907 | Haeff et al. | Aug. 7, 1951 |
| 2,639,386 | Karpeles | May 19, 1953 |
| 2,658,992 | Byrne | Nov. 10, 1953 |